United States Patent [19]

Combs

[11] Patent Number: 4,964,716
[45] Date of Patent: Oct. 23, 1990

[54] REMOVABLE COVER FOR EYEGLASS NOSE PAD

[76] Inventor: Gary D. Combs, 14090 Lenmore, Belleville, Mich. 48111

[21] Appl. No.: 462,758

[22] Filed: Jan. 10, 1990

[51] Int. Cl.⁵ .............................................. G02C 5/12
[52] U.S. Cl. ...................................... 351/139; 351/88
[58] Field of Search ..................... 351/76, 80, 88, 139, 351/158

[56] References Cited

U.S. PATENT DOCUMENTS

| | | | |
|---|---|---|---|
| 2,216,503 | 10/1940 | Ring | 88/48 |
| 2,463,041 | 3/1949 | Malcolm | 88/48 |
| 2,991,694 | 7/1961 | Whipple | 88/41 |
| 3,186,001 | 5/1965 | Roeder | 351/138 |
| 4,070,104 | 1/1978 | Rice | 351/138 |
| 4,251,302 | 2/1981 | Leonard et al. | 351/139 |
| 4,732,464 | 3/1988 | Bononi | 351/88 |

Primary Examiner—Paul M. Dzierzynski
Attorney, Agent, or Firm—Basile and Hanlon

[57] ABSTRACT

A removable cover for eyeglass nose pads includes first and second members having releasably engageable portions formed of interlocking hook and pile. One of the first and second members is adhesively and fixedly mounted on the nose pad of a pair of eyeglasses with the releasably engageable portion facing away from the nose pad. The other of the first and second members is adhesively joined to a soft, fabric sheet having a size approximate the size and shape of the eyeglass nose pad. The first and second members are releasably engageably to releasably mount the fabric sheet on the nose pad. The sheet can be removed from the eyeglass nose pad for cleaning or replacement.

6 Claims, 1 Drawing Sheet

REMOVABLE COVER FOR EYEGLASS NOSE PAD

BACKGROUND OF THE INVENTION

Field of the Invention

The present invention relates, in general, to eyeglasses and, specifically, to eyeglass nose pads.

Eyeglasses employ opposed nose pads located adjacent the inner, opposed facing edges of the eyeglass lenses to mount the eyeglasses on the nose of a wearer. Such nose pads are formed of plastic or metal and are connected to the eyeglass frame by arms extending from the frames or are integrally formed as an enlarged area as a part of the frame.

Typically, such nose pads have a hard, smooth surface which causes the eyeglasses to slide down the nose of the wearer when the wearer moves his or her head, especially when the wearer's nose is wet or oily. Such slippage is more pronounced and creates a greater problem in hot or humid conditions.

Various attempts have been made to prevent or minimize such slippage of eyeglasses. Foam rubber nose pads, ribbed pads or pads formed with a rough surface have been devised to hold a pair of eyeglasses in position on a wearer's nose. Such nose pads are permanently formed as a part of the eyeglasses, are permanently mounted on the eyeglass nose pads, typically through the use of an adhesive, or are removably attached to the eyeglass frames via screws or snap-in projections. In addition, such nose pads have been specifically formed for a particular size and shape eyeglass frame.

Removal and/or replacement of the nose pads when broken, soiled, etc., is difficult due to the small size of such nose pads. In the case of permanently attached nose pads, such removal and/or replacement is impossible.

Thus, it would be desirable to provide a nose pad for a pair of eyeglasses which provides a secure surface to minimize slippage of the eyeglasses in use. It would also be desirable to provide a cover for a nose pad which can be easily attached to and removed from an eyeglass nose pad. It would also be desirable to provide a cover for a nose pad which is removable and capable of being cleaned for reuse. It would also be desirable to provide a cover for a nose pad which may be constructed in any shape or form for use with any shape or size eyeglass nose pad. Finally, it would be desirable to provide a nose pad cover which is formed of inexpensive materials for a low cost.

SUMMARY OF THE INVENTION

The present invention is a removable cover for eyeglass nose pads. The removable cover includes first and second members having releasably engageable portions formed of interlocking hook and pile. One of the first and second members is fixedly mounted on the nose pad of a pair of eyeglasses, with the releasably engaging portion thereof facing outward from the nose pad. The other of the first and second members is fixedly mounted to a soft, flexible sheet having a size approximate the size and shape of the eyeglass nose pad.

The first and second members are releasably engageable to removably mount the cover on the eyeglass nose pad. However, the cover can be easily removed for cleaning or replacement whenever necessary.

In a preferred embodiment, the first and second members are fixedly mounted to the eyeglass nose pads and the soft sheet, respectively, by means of an adhesive. Further, the soft, flexible sheet is preferably formed of a thin, soft fabric, such as cotton, corduroy, etc.

The removable cover provides a secure surface which minimizes slippage of the eyeglasses down the nose of a wearer when the wearer moves his or her head about or when the wearer's nose is wet or oily, such as in hot or humid conditions. Yet, the cover is easily removed from the nose pad for replacement with a new cover or for cleaning and reuse. The cover and the first and second releasably engageable members may be constructed in any size or shape so as to enable the removable cover of the present invention to be employed with any size or shape eyeglass nose pad. The removable eyeglass nose pad cover of the present invention may also be employed with any type of nose pad construction, such as nose pads which are connected by thin arms to the eyeglass frames or nose pads which are integrally formed with the eyeglass frame as an enlarged area or portion of the frame.

Finally, the cover may be formed of any suitable soft, flexible fabric, such as cotton, corduroy, etc. for a low manufacturing cost.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
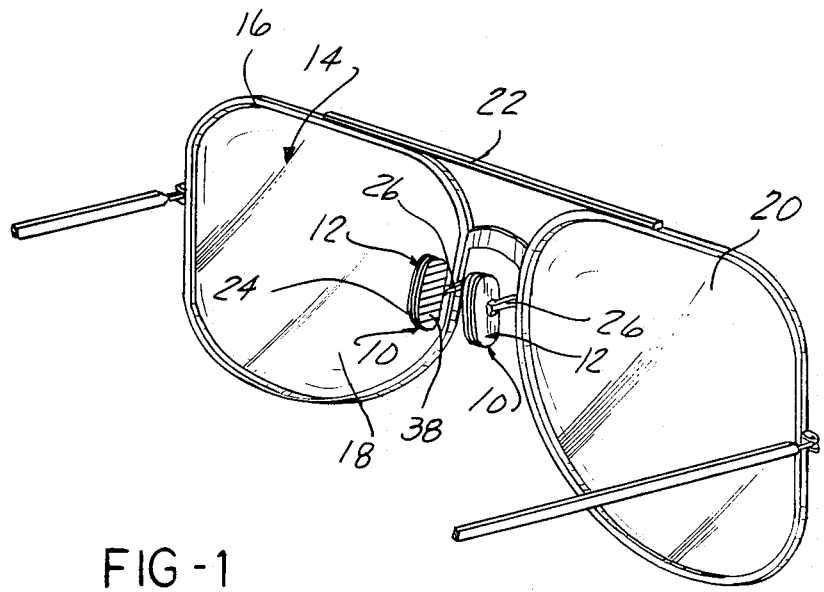
FIG. 1 is a perspective view of a pair of eyeglasses having a removable cover of the present invention attached to the nose pads thereof.

Throughout the following description and drawing, an identical reference number is used to refer to the same component shown in multiple figures of the drawing.

Referring now to the drawing, and to FIG. 1 in particular, there is illustrated a nose pad cover 10 which is removably mountable on the nose pads 12 of a pair of eyeglasses 14.

The pair of eyeglasses 14 are conventionally constructed and include a frame 16 surrounding and holding a pair of lenses 18 and 20. A nose piece or bridge 22 extends between the lenses 18 and 20 and forms a part of the frame 16.

Figures 2, 3:
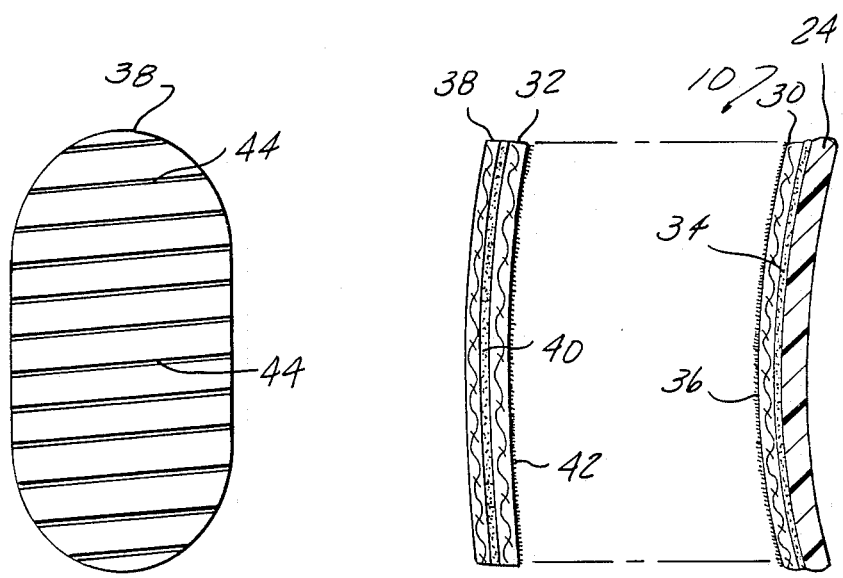
FIG. 2 is an enlarged, front, elevational view showing the flexible sheet of the removable eyeglass nose pad cover of the present invention.
FIG. 3 is an enlarged, exploded, cross sectional view showing the construction of the removable eyeglass nose pad cover of the present invention.

The nose pads 12 are mounted on the inner, opposed surfaces of the frame 16 adjacent to each lens 18 and 20. As shown in FIGS. 1 and 3, the nose pads 12 are in the form of a substantially oval body 24 which is securely connected to the eyeglass frame 16 by means of a thin arm 26 which extends from the body 24 to the frame 16. Alternately, the body 24 of each nose pad 12 may be formed as an integral, molded portion of the frame 16.

The removable eyeglass nose pad cover 10 is formed of a plurality of elements which are mountable on each nose pad 12. As shown in FIGS. 1, 2 and 3, each removable cover 10 includes first and second releasably engageable members 30 and 32, respectively. The first and second members 30 and 32 are formed of thin sheets having interlocking hook and pile or loop portions formed on one side or surface, such as sheets sold under the registered trademark Velcro. The first and second members 30 and 32 may have any size, although a size and shape approximate the size and shape of the body 24 of the nose pad 12 is preferred. Further, it is of no consequence which of the first and second members 30 and 32 has the hooks or which one has the pile or loops.

Means are provided for fixedly mounting the first member 30 to the body 24 of each nose pad 12. In a preferred embodiment, a layer of an adhesive 34 is applied to one surface of the first member 30 to securely mount the first member 30 to the outer surface of the body 24 of the nose pad 12. In this orientation, as shown in FIG. 3, the interlocking hook or loop portions 36 of the first member 30 face outward from the body 24 of the nose pad 12. Any suitable adhesive which retains its adhesive qualities under high heat and humidity conditions may be employed for the adhesive layer 34. For example, contact cement or so-called "super glue" may be utilized.

The second member 32 is identically shaped as the first member 30. Means are provided for fixedly securing the second member 32 to a thin, soft, flexible sheet 38. Preferably, a layer of an adhesive 40 is employed to permanently attach the second member 32 to the sheet 38. The adhesive 40 is identical to the adhesive 34 and may be applied to the sheet 38 or to the second member 32.

The thin sheet 38 has a shape approximate the shape of the second member 32 and the body 24 of the nose pad 12. The sheet 38 may be formed of any suitable material which is soft and flexible. Preferably, a fabric material, such as cotton, corduroy, etc. is employed to form the sheet 38.

As in FIG. 3, the joined second member 32 and the sheet 38 are oriented such that the interlocking hook or loop portion 42 of the second member 38 face and are releasably engageable with the hook or loop portion 36 of the first member 30. In this manner, the sheet 38 may be releasably mounted to the nose pad 12 by means of the interlocking portions of the first and second members 30 and 32. At the same time, the sheet 38 may be removed from the nose pad 12 for cleaning or replacement with a new, fresh sheet 38.

FIG. 2 depicts one embodiment of the sheet 38 in which the sheet 38 is formed of a ribbed, corduroy material. This material includes a plurality of thin, spaced ribs 44 which extend along the length of one side of the sheet 38. Such ribs 44 provide additional adhesion of the sheet 38 to the nose of a wearer of the eyeglasses 14 and prevent or minimize slippage of the eyeglasses 14 down the nose of the wearer.

In use, the first member 30 is cut to the desired size and adhesively mounted on the body 24 of a nose pad 12 of a pair of eyeglasses 14. The second member 32 is cut to a similar size and adhesively attached to a similarly sized sheet 38. The second member 32 is then releasably attached to the first member 30 to mount the sheet 38 on the nose pad 12 of a pair of eyeglasses.

The removable eyeglass nose pad cover of the present invention provides a unique attachment to the nose pads of a pair of eyeglasses which minimizes or prevents slippage of the eyeglasses during use of the eyeglasses and especially in hot or humid conditions. The removable cover is easily attached to and removed from the eyeglass nose pads for cleaning or replacement. Further, the removable cover is of simple construction and is formed of an inexpensive material for a low manufacturing cost.

What is claimed is:

1. A nose pad cover for a nose pad on a pair of eyeglasses comprising:
    first and second members having releasably engageable portions formed of interlocking hook and pile;
    means for fixedly mounting one of the first and second members on the nose pad of a pair of eyeglasses with the releasably engageable portion thereof facing away from the nose pad of the pair of eyeglasses;
    a flexible sheet;
    means for fixedly mounting the other of the first and second members to the flexible sheet, with the releasably engageable portion of the other of the first and second members facing away from the flexible sheet; and wherein
    the first and second members are releasably engageable to removably mount the flexible sheet on the nose pad of the pair of eyeglasses such that the flexible sheet is positioned to contact the nose of a wearer of the pair of eyeglasses.

2. The nose pad cover of claim 1 wherein the means for fixedly joining the first and second members to the nose pad of the eyeglasses and to the sheet, respectively, is an adhesive.

3. The nose pad cover of claim 1 wherein the first and second members and the sheet have a shape substantially the same as the shape of the nose pad of a pair of eyeglasses.

4. The nose pad cover of claim 1 wherein the sheet is a soft, fabric sheet.

5. The nose pad cover of claim 4 wherein the fabric sheet has a plurality of spaced ribs formed on one side thereof.

6. A nose pad cover for a nose pad of a pair of eyeglasses comprising:
    first and second members having releasably engageable portions formed of interlocking hook and pile;
    the first member adhesively mountable on the nose pad of a pair of eyeglasses, with the releasably engageable portion thereof facing away from the nose pad of the pair of eyeglasses;
    a soft, flexible, fabric sheet;
    the second member adhesively joined to the fabric sheet, with the releasably engageable portion of the second member facing away from the fabric sheet; and wherein
    the first and second members are releasably engageable to releasably mount the sheet on the nose pad of a pair of eyeglasses such that the sheet is positioned to contact the nose of a wearer of the pair of eyeglasses.

* * * * *